United States Patent [19]

Lehman

[11] Patent Number: 4,576,462
[45] Date of Patent: Mar. 18, 1986

[54] ILLUMINATION SYSTEM FOR AN ELECTROPHOTOGRAPHIC PRINTING DEVICE

[75] Inventor: Richard F. Lehman, Webster, N.Y.
[73] Assignee: Xerox Corporation, Stamford, Conn.
[21] Appl. No.: 678,316
[22] Filed: Dec. 5, 1984
[51] Int. Cl.⁴ .............................................. G03G 15/01
[52] U.S. Cl. ...................................... 355/14 R; 355/4; 355/70; 362/18; 362/298
[58] Field of Search ..................... 355/3 R, 14 E, 14 R, 355/67, 70, 71, 4, 37; 362/3, 11, 16–18, 298, 346

[56] References Cited

U.S. PATENT DOCUMENTS

| | | | |
|---|---|---|---|
| 3,825,335 | 7/1974 | Reynolds | 355/1 |
| 3,841,752 | 10/1974 | Terajima et al. | 355/4 |
| 3,950,093 | 4/1976 | Schneider | 35/37 |
| 4,124,292 | 11/1978 | Van Wandelen | 355/37 |
| 4,351,019 | 9/1982 | Avey et al. | 362/298 |

*Primary Examiner*—R. L. Moses
*Attorney, Agent, or Firm*—Joseph R. Sakmyster

[57] ABSTRACT

A selective color copyability illuminator includes a pair of lamps each having a spectral emission suitable for copying black and white documents or documents incorporating a specific color. The lamp emissions are selectively controlled depending upon the color of the document being copied. Faceted reflectors, associated with each lamp, are moved to positions which cover or uncover the lamp aperture to enhance selective deletion of a particular color of the document being copied.

3 Claims, 2 Drawing Figures

ILLUMINATION SYSTEM FOR AN ELECTROPHOTOGRAPHIC PRINTING DEVICE

This invention relates generally to an electrophotographic printing device, and more particularly to an improved selective color illuminating system to be utilized in such a device.

It is a goal of a non-color reproduction device (e.g. a copier or printer which produces black and white copies of an original) to be able to reproduce colored originals as well as black and white original documents. The ability of a reproduction device to so so is a function of the spectral response of the device and the spectral reflectance of the colors of the original document. The spectral response is determined by the properties of the illumination source used to illuminate the original document and the properties of the photosensitive imaging member (photoreceptor drum or belt).

It is known in the art to use a pair of lamps with complementary wavelength emissions to provide either a white light when copying black and white documents or to selectively enhance or suppress the copyability of a document of a specific color by changing the emission ratio of the two lamps. Such a system is disclosed in U.S. Pat. No. 3,841,752 and copending U.S. application Ser. No. 514,372, whose contents are hereby incorporated by reference.

The present invention is directed towards a compact illumination system. More specifically, the invention is directed towards a document imaging system including an illumination source for illuminating an original document lying in an object plane, said illumination source comprising a first and second apertured lamp placed on opposite sides of a scan strip beneath said object plane,
- said first lamp adapted to direct a band of light of a first spectral emission to said scan strip, said second lamp adapted to direct a band of light of a second spectral emission, complementary to said first emission to said scan strip,
- a first and second faceted reflector associated with said first and second lamp respectively, said reflectors rotatably mounted and adapted to cover or uncover the aperture of said associated lamp in response to original document color conditions, and
- means for moving said reflectors into and out of an operative position in response to the operation of said lamp enabling means.

DRAWINGS

DESCRIPTION

Figure 1:
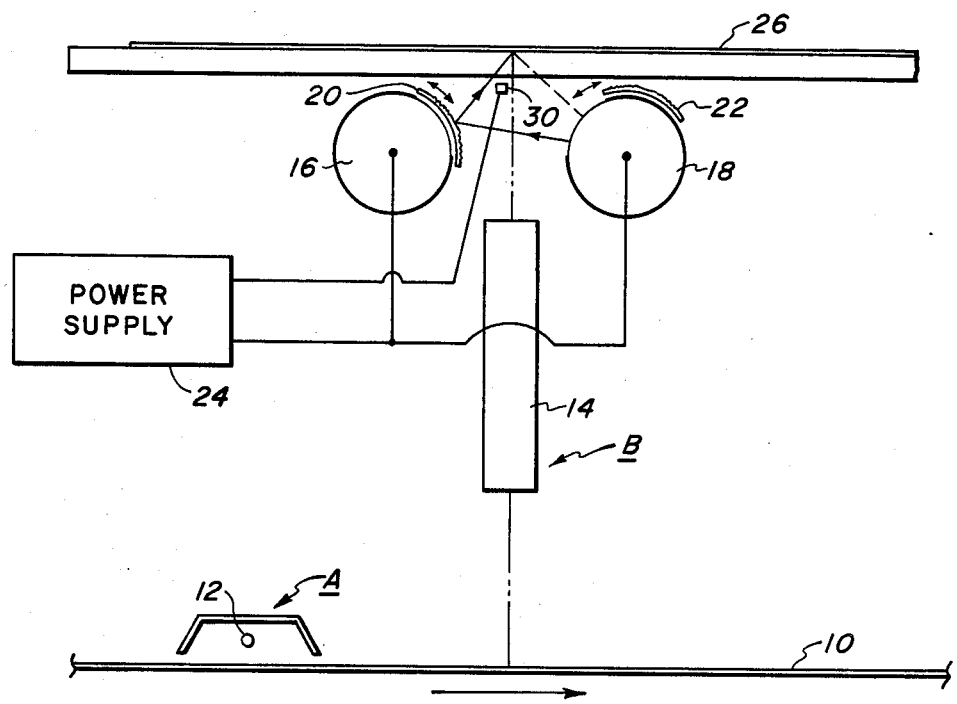
FIG. 1 is a schematic diagram of a document reproduction system utilizing the improved illumination system of the invention.

Referring now to FIG. 1, there is shown a schematic illustration of an automatic xerographic reproducing device for making black and white copies from either a black and white or a colored original document utilizing the illumination system of the present invention. As will become clear from the disclosure below, the instant invention is suited for use in a wide variety of copying or printing machines and the teachings herein embodied are not necessarily restricted to the particular machine environment disclosed. Basically, the xerographic reproducing apparatus employs a photoreceptor belt 10 which is preferably formed of a material having a relatively panchromatic response to visible light. The belt is arranged to move sequentially through a series of processing stations in the direction indicated. The belt first passes through a charging station A in which is located a corona generating device 12 extending tranversely across the belt surface which is arranged to bring the photoconductive surfce to a relatively high uniform charge potential.

Figure 2:
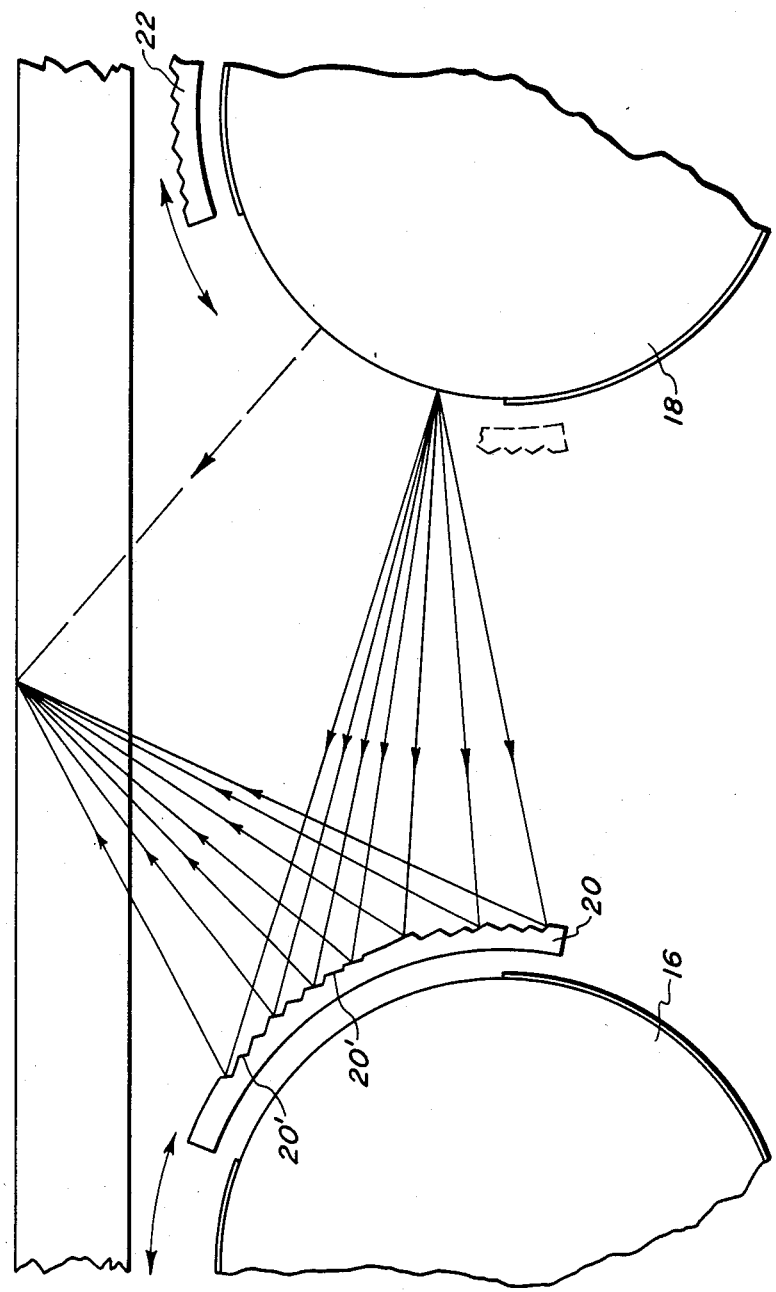
FIG. 2 is an enlarged view of the illumination lamps showing the enhanced efficiency of the lamp/reflector illuminator at the platen.

Belt 10 is next transported through an exposure station B which includes a gradient index lens array 14 and a pair of fluorescent lamps 16, 18 having associated faceted reflectors 20, 22. Power to the lamps is provided by power supply 24. An original document 26 is supported upon a transparent platen 28. Platen 28 is adapted to move through the exposure zone so as to enable successive areas of original 26 to be illuminated by either of lamps 16, 18. A scanned image line is transmitted through lens array 14 and focused at the surface of belt 10. Platen 28 moves in timed relation with belt 10 to create a flowing light image on the belt surface. Alternatively, the platen can be held stationary and the lamps and lens array moved to provide the scanning function as is known in the art. Photodetector 30 is located in a position near the platen so as to sample the illumination level near the platen surface. The output signal generated by photodetector 30 is sent to power supply 24 to adjust the lamp power to maintain constant exposure. Lamps 16 and 18 are selected so as to provide combined emission in a wavelength range which will provide copyability of black and white documents as well as selective emissions to enable copying of documents dominated by a specific color. The selective emission, or more precisely, deletion, is accomplished by moving a pair of arcuate faceted reflectors 20, 22 from an open position where the aperture of the associated lamp is uncovered, to a closed position wherein the aperture of the associated lamp is covered. The reflector associated with the inoperative lamp can thus be rotated into a position to reflect substantially all the incident light from the operative lamp onto the scan surface. This increases the efficiency of the operative lamp by as much as 80% dependent upon the effective exposure zone width. Moreover, the preferred arcuate form of the reflectors, conforming to the circular surface of the lamp envelope, permits a compact design allowing the lamps to be placed directly adjacent the platen as shown in FIGS. 1 and 2. The reflectors may be rotated manually or by mechanical means such as an electromechanical, solenoid-driven mechanism.

As one example of a selective illumination system according to the invention, lamp 16 has a phosphor coating which will provide an emission in the wavelength range of 590 to 700 nm. This wavelength includes the red wavelength region. Lamp 18 has a phosphor coating which will provide an emission in the wavelength range of 450 to 530 nm. This wavelength range includes the blue wavelength region. With this illumination system in place, several modes of illumination are possible. Lamps 16 and 18 may be operated with both of the associated reflectors in the open position. In this mode, the combined lamp emissions provide color copyability of documents of all colors but the level is normally set so as to provide average copyability for documents other than black and white documents. If the original document is dominated by a specific color, the operator has additional modes of illumination available which can enhance the copyability of the particular colored document. For example, if the original document is dominated by blue colors, or has blue markings, underlinings or the like, reflector 22 can be rotated to the closed position, either manually by the operator, or electrically by provision of a suitable control solenoid. The red emission from lamp 16 with reflector 20 in the open position will delete the red components, enhancing blue copyability. The efficiency of the system is enhanced by the reflection of the light from lamp 16 by reflector 20. Similarly, if the original document is dominated by red colors, reflector 20 is rotated to the closed position and reflector 22 to the open position. The blue emission from lamp 18 deletes the blue component, enhancing red copyability. Reflector 20 reflects a component of the direct light from lamp 18 to the scan strip.

It is thus seen that the arcuate nature of the faceted reflector permits the lamps to be placed very close to the bottom surface of the platen. The emission from each lamp thus has a direct component and an indirect component reflected from the non-associated reflector when in a closed position. Virtually all of the lamp emission is thus available to illuminate the scan strip, i.e. the system has the same efficiency as a single lamp and reflector.

When operating in one of the selective copyablity modes, the power requirements to the emitting lamp may have to be increased. Photodetector 30 senses a lower illumination level and sends a signal to power supply 24 to increase the power to the lamp. A power supply as described in copending application U.S. Pat. No. 514,372 is suitable for this purpose.

A feature of the present invention is the compact design which is enabled by the lamp/reflector arrangement. The reflectors can be formed on a thin substrate so as to take up very little space. The lamps can then be places as close to each other as is theoretically possible. This compactness is not possible with conventional lamp/reflector configuration.

Referring now to FIG. 2, there is shown in enlarged detail, the present illumination system. In the state shown, faceted reflector 20 is in the closed position, lamp 16 is off and reflector 22 is in the open position indicating a document with red color is being copied. Light from the aperture of lamp 18 proceeds directly to the scan area of the platen and by reflection from the facets 20' of reflector 20. Each of the facets is a plane mirror having an angle such that light incident from lamp 18 is reflected to the same area as platen 28, e.g. the incremental scan zone. Reflectors 20, 22 are formed on a thin substrate and can be made, for example, as disclosed in U.S. Pat. No. 4,190,355.

As a second embodiment, reflectors 20, 22 can be made of a material exhibiting dichroicity. For example, reflector 20 could be made of a transparent material designed to transmit the red light of lamp 16 but reflect the blue light of lamp 18. Reflector 22 could similarly be designed to transmit the blue light of lamp 18 but reflect the red light of lamp 16.

In conclusion, it may be seen that there has been disclosed an improved dual lamp illumination system. The use of the faceted reflectors increases the effectiveness of a single lamp by as much as 80% depending on the effective width of the scan strip. One specific reflector configuration could be a Fresnel reflector.

It is contemplated that further variations and modifications may be made within the purview of those skilled in the art. For example, while the projection system comprised a linear gradient index transmitter, the invention may be utilized with other, conventional non-linear projection lenses. Further, while the lamps in the illustrated embodiment had blue or red emission phosphors, other phosphors such as green emission phosphor may be used. Still further, while arcuate faceted reflectors are shown as a preferred embodiment, different reflector configurations could be employed. The following claims are intended to cover all such variations and modifications as fall within the spirit and scope of the invention.

What is claimed is:

1. A document imaging system including an illumination source for illuminating original documents having differing copyability requirements to be placed in an object plane, said illumination source comprising a first and second apertured lamp placed on opposite sides of a scan strip beneath said object plane,
   said first lamp adapted to direct a band of light of a first spectral emission to said scan strip, said second lamp adapted to direct a band of light of a second spectral emission, complementory to said first emission to said scan strip,
   a first and second faceted reflector associated with said first and second lamp respectively, said reflectors rotatably mounted and adapted to cover or uncover the aperture of said associated lamp in response to original document color conditions, and
   means for moving said reflectors into and out of an operative position in response to said document copyability requirements.

2. The imaging system of claim 1 wherein said reflectors are formed of a material exhibiting dichroicity such that said first reflector transmits the emission of said first lamp but reflects the emission of said second lamp and said second reflector transmits the emission of said second lamp but reflects the emission of said first lamp.

3. A document reproduction device including an illumination system for illuminating an original document lying in an object plane, said illumination system comprising a first and second lamp placed on opposite sides of a scan strip on said object plane,
   said first lamp adapted to direct a band of light of a first spectral emission to a linear scan strip, said second lamp adapted to direct a band of light of a second spectral emission to said scan strip,
   a first faceted reflector rotatable into and out of the emission path of said first lamp,
   a second faceted reflector rotatable into and out of the emission path of said second lamp,
   means to rotate said reflectors coincident with said lamp selection,
   means for projecting an image of said document onto a photosensitive image plane, and
   means for detecting the illumination level at said object plane and controlling the power input to said lamps so as to maintain a desired illumination level.

* * * * *